(12) United States Patent
DeMuth

(10) Patent No.: US 9,819,160 B2
(45) Date of Patent: Nov. 14, 2017

(54) CONTINUOUS CONDUIT WITH PRE-INSTALLED INNERDUCTS

(71) Applicant: Blue Diamond Industries, LLC, Lexington, KY (US)

(72) Inventor: Robert B. DeMuth, Lexington, KY (US)

(73) Assignee: BLUE DIAMOND INDUSTRIES, LLC, Lexington, KY (US)

( * ) Notice: Subject to any disclaimer, the term of this patent is extended or adjusted under 35 U.S.C. 154(b) by 619 days.

(21) Appl. No.: 14/059,938

(22) Filed: Oct. 22, 2013

(65) Prior Publication Data

US 2014/0119834 A1    May 1, 2014

Related U.S. Application Data

(60) Provisional application No. 61/718,381, filed on Oct. 25, 2012.

(51) Int. Cl.
| | |
|---|---|
| *B29C 47/20* | (2006.01) |
| *B29D 23/00* | (2006.01) |
| *H02G 1/06* | (2006.01) |
| *H02G 9/06* | (2006.01) |
| *G02B 6/44* | (2006.01) |

(52) U.S. Cl.
CPC ............... *H02G 1/06* (2013.01); *B29C 47/20* (2013.01); *B29D 23/001* (2013.01); *G02B 6/4459* (2013.01); *H02G 9/06* (2013.01); *Y10T 29/4998* (2015.01)

(58) Field of Classification Search
CPC ........ B29D 23/00; B29D 23/001; B29C 47/20

USPC .......... 174/113 R; 138/111; 264/209.1, 150, 264/177.1; 425/113
See application file for complete search history.

(56) References Cited

U.S. PATENT DOCUMENTS

| | | | | |
|---|---|---|---|---|
| 3,892,912 | A | * 7/1975 | Hauck | ................... B29C 47/128 174/113 R |
| 4,623,504 | A | * 11/1986 | Smith | ..................... B29C 47/02 156/244.21 |
| 4,688,890 | A | 8/1987 | Demeo et al. | |
| 4,741,593 | A | 5/1988 | Fochler | |
| 5,027,864 | A | 7/1991 | Conti et al. | |
| 6,101,304 | A | 8/2000 | Quistorff et al. | |
| 6,398,190 | B1 | 6/2002 | Li | |
| 6,676,881 | B1 | 1/2004 | Byun | |
| 6,774,311 | B1 | 8/2004 | Byun | |
| 7,046,898 | B2 | 5/2006 | McLarty et al. | |
| 2005/0194578 | A1 | 9/2005 | Morris | |
| 2008/0054236 | A1 | 3/2008 | Morris | |
| 2008/0121410 | A1 | 5/2008 | McCall et al. | |
| 2013/0037157 | A1 | 2/2013 | Morrow et al. | |
| 2015/0144218 | A1* | 5/2015 | Morrow | ............. B29C 47/0023 138/111 |

OTHER PUBLICATIONS

Mark Brown correspondence regarding Petroflex NA, LTD Multi-Cell Conduit, dated Apr. 24, 2014, 2 pages.
Mark Brown, "Exhibit A" to correspondence regarding Petroflex NA, LTD Multi-Cell Conduit, dated Apr. 24, 2014, 2 pages.
Mark Brown, "Exhibit B" to correspondence regarding Petroflex NA, LTD Multi-Cell Conduit, dated Apr. 24, 2014, 2 pages.

* cited by examiner

*Primary Examiner* — Sunil Singh
(74) *Attorney, Agent, or Firm* — King & Schickli, PLLC

(57) ABSTRACT

A boreable multiduct assembly packaged for sale includes a receiver, a continuous outer conduit having a central lumen and multiple innerducts held freely in that lumen.

6 Claims, 3 Drawing Sheets

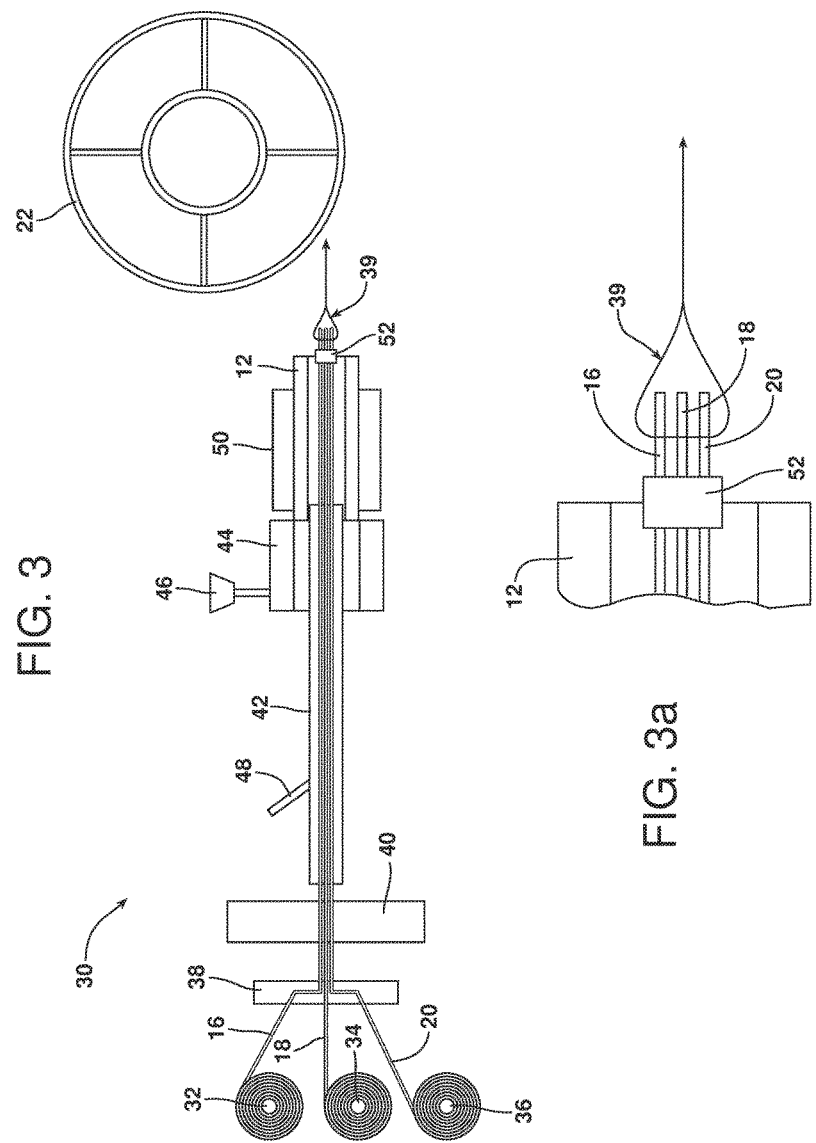

CONTINUOUS CONDUIT WITH PRE-INSTALLED INNERDUCTS

This utility patent application claims the benefit of priority in U.S. Provisional Patent Application Ser. No. 61/718,381 filed on Oct. 25, 2012, the entirety of the disclosure of which is incorporated herein by reference.

TECHNICAL FIELD

This document relates generally to underground conduit systems and more particularly to a multi-duct or multichannel conduit assembly as well as an improved method for more efficiently and effectively completing an underground multichannel conduit installation.

BACKGROUND

Underground networks of fiber optic cables, coaxial cables, electrical wires and the like are generally protected by multi-duct or multichannel conduit systems. Examples of such conduit systems are found in, for example, U.S. Pat. No. 6,676,881 to Byun, U.S. Pat. No. 6,774,311 to Byun, U.S. Pat. No. 4,688,890 to De Meo et al., U.S. Pat. No. 4,741,593 to Fochler, U.S. Pat. No. 5,027,864 to Conti et al. and U.S. Pat. No. 6,101,304 to Quistorff.

This document relates to a new and improved multi-duct assembly with prepositioned innerducts freely received within a central lumen of a continuous outer conduit. Advantageously, the assembly may be utilized to more efficiently and effectively complete an underground multichannel conduit installation.

SUMMARY

A multiduct assembly packaged for sale and installation comprises a receiver and a continuous outer conduit held by the receiver. The continuous outer conduit includes a central lumen. A first innerduct is held in the lumen. A second innerduct is held in the lumen. The first and second innerducts are freely received and held in the lumen. Further, the first and second innerducts are free from one another.

In accordance with an additional aspect a first fastener may be provided to secure the first end of the first innerduct to a lead end of the outer conduit. Similarly, the same or a second fastener may be provided to secure a free or first end of the second innerduct to the lead end of the outer conduit. In one possible embodiment the first and second fasteners are removable. In another possible embodiment the first and second fasteners are heat resistant adhesive tape.

In yet another embodiment a third innerduct is held in the lumen. In yet another embodiment a fourth innerduct is held in the lumen. In one possible embodiment the receiver is selected from a group of structures consisting of a box, a reel, a winder, a spool, a crate and a container.

In accordance with an additional aspect, a method is provided for allowing a contractor to complete an underground multichannel conduit installation in a single step. That method comprises furnishing on a receiver a preassembled continuous multiduct assembly including a continuous outer conduit and multiple innerducts held within a lumen of the continuous outer conduit. The method further includes a step of paying out the preassembled continuous multiduct assembly from the receiver and positioning the preassembled multiduct assembly in a trench. Further the method includes running lines through the innerducts and covering the preassembled multiduct assembly in the trench.

In accordance with yet another aspect, a method of manufacturing a multiduct assembly is provided. That method comprises the steps of extruding a continuous outer conduit with a lumen, positioning multiple innerducts within the lumen during extrusion of the continuous outer conduit, and providing cooling to the innerducts during positioning in the lumen so as to prevent sticking of the innerducts to each other and to the continuous outer conduit during the manufacturing process.

The method further includes the step of providing cooling by blowing cooling air along the innerducts. Further the method includes temporarily securing the free ends of the innerducts to the outer conduit prior to completing extrusion of the outer conduit so that the innerducts are pulled through the outer conduit as it is being extruded. More specifically the method includes attaching the multiple innerducts together adjacent free ends thereof prior to feeding through the lumen and connecting the free ends to the outer conduit. This includes attaching a pull line to the taped innerducts, feeding the end of the pull line through the extruded outer conduit until it attaches to a soft extruded portion of the outer duct and then cutting the outer conduit past the line attachment point. This is then followed by pulling the line slack through the lumen of the outer conduit and taping the line to the end of the outer conduit.

Still further the method includes the steps of cutting the outer conduit and innerducts off at a position downstream from the pull line and applying a high temperature lubricant to the innerducts before the innerducts enter the lumen to help prevent the innerducts from sticking to the outer conduit. Further the method includes winding the continuous multiduct assembly onto a reel so that it is packaged for sale and easy installation.

These and other embodiments of the present invention will be set forth in the description which follows, and in part will become apparent to those of ordinary skill in the art by reference to the following description.

BRIEF DESCRIPTION OF THE DRAWINGS

The accompanying drawings incorporated herein and forming a part of the specification, illustrate several aspects of the multiduct conduit assembly and together with the description serve to explain certain principles thereof. In the drawings:

FIG. 3 is a schematical illustration of the production line for the multiduct assembly.

FIG. 3a is a schematic illustration of the portion of production line of FIG. 3.

Reference will now be made in detail to the present preferred embodiments of the multiduct assembly, examples of which are illustrated in the accompanying drawings.

DETAILED DESCRIPTION

Figure 1:
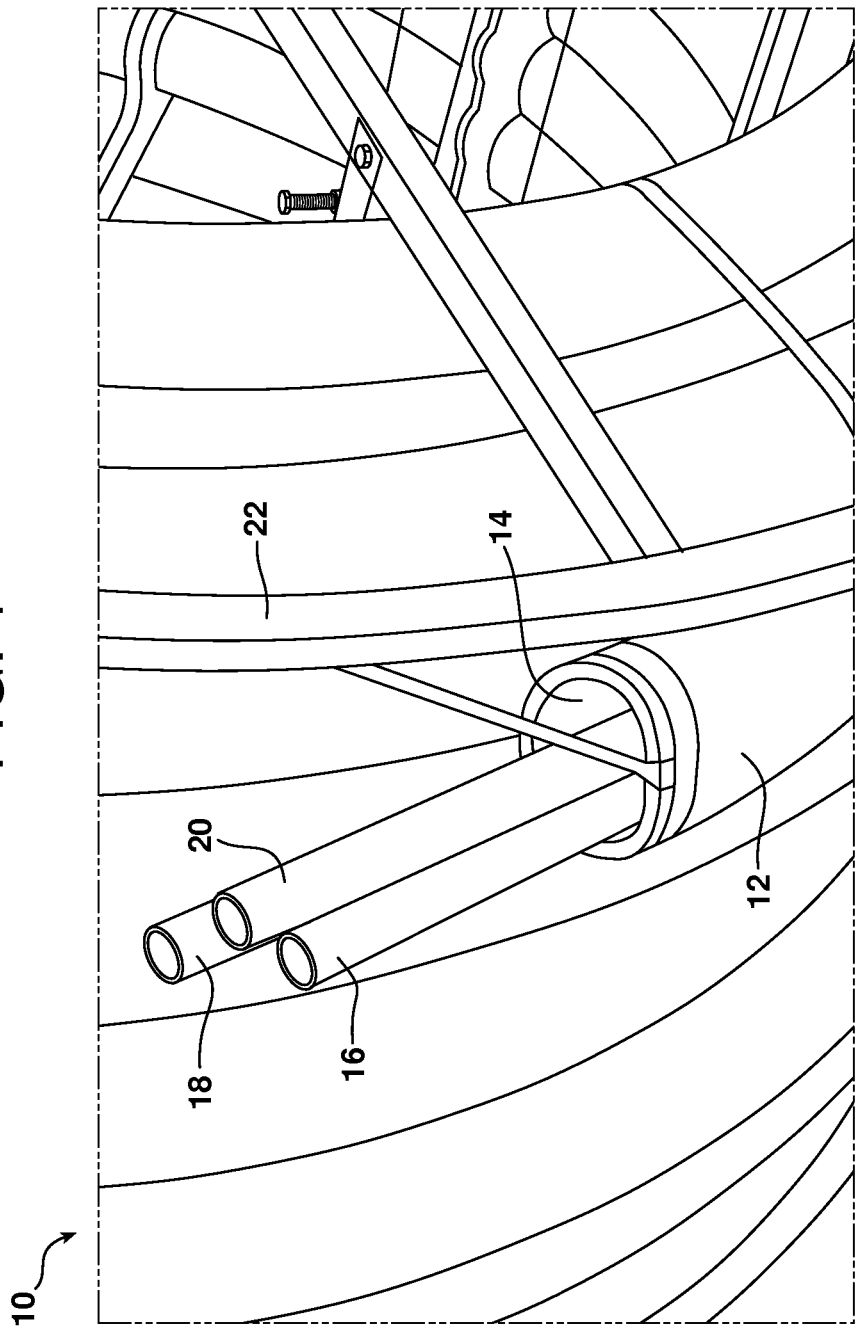
FIG. 1 is a detailed perspective view of the multiduct assembly packaged for sale on a receiver reel.
Figure 2:
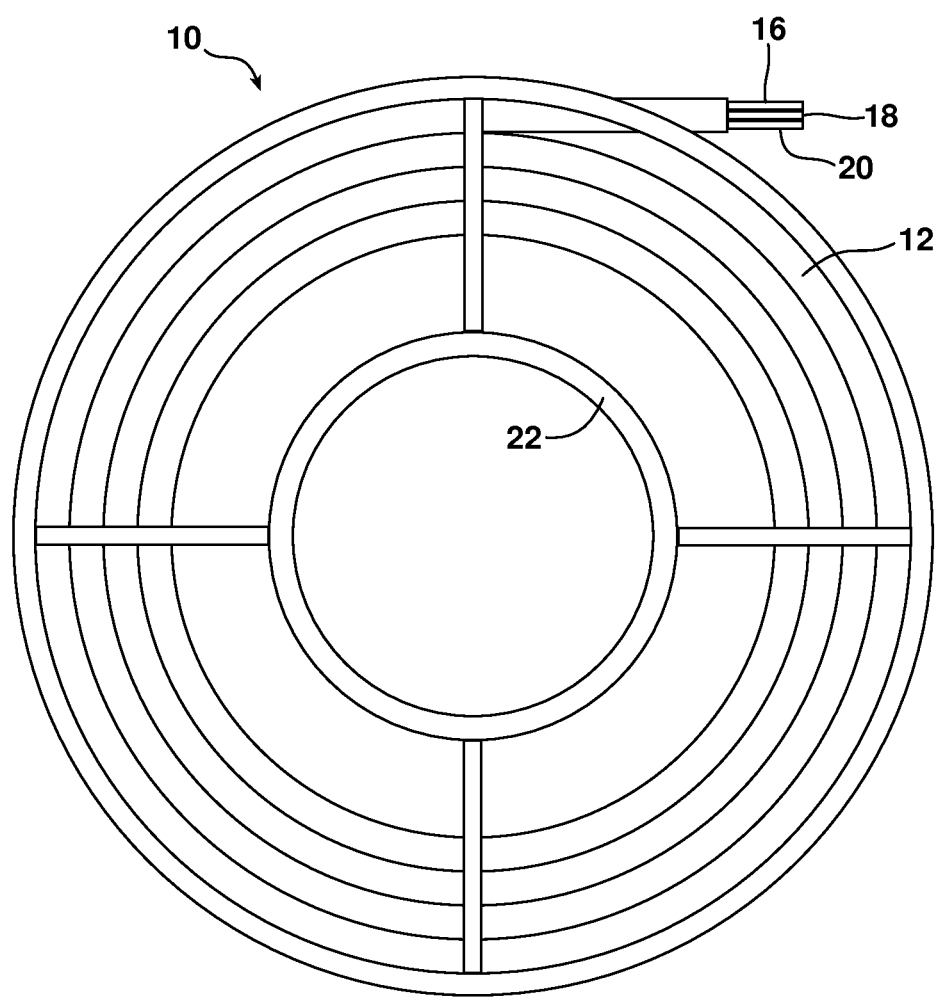
FIG. 2 is a side elevational view of the multiduct assembly on a reel as illustrated in FIG. 1.

Reference is now made to FIGS. 1 and 2 illustrating the boreable multiduct assembly 10 packaged for sale to a user customer. The multiduct assembly 10 comprises a continuous outer conduit 12 including a central lumen 14. The continuous outer conduit may be made from a material including, but not limited to polyethylene.

In the illustrated embodiment a first innerduct 16, a second innerduct 18, and a third innerduct 20 are received and held in the lumen 14 of the outer conduit 12. The entire multiduct assembly 10 is then wound onto a receiver 22. In the illustrated embodiment the receiver 22 comprises a winding reel. It should be appreciated that in other embodiments the receiver 22 may comprise a box, a spool, a crate or even a container.

The innerducts 16, 18, 20 may be made from the same or different materials. Those materials include but are not limited to polyethylene.

Significantly, the innerducts 16, 18, 20 of the multiduct assembly 10 are all loose in the lumen 14. By that it is meant that the innerducts 16, 18, 20 are not connected to each other or to the outer conduit 12 by melting or plastic fusion. This provides three important benefits to the customer. First, the walls of each innerduct 16, 18, 20 and the outer conduit 12 are all maintained with full integrity and within design specification. If the innerducts 16, 18, 20 were allowed to melt together or with the outer conduit 12 during manufacture the wall and design specification could well be compromised.

Second, by being loose the innerducts 16, 18, 20 may be repositioned as required to insert a pulling eye into the outer conduit 12. A pulling eye is standard for pulling back a conduit in a bore situation. Third, the loose innerducts 16, 18, 20 are more easily accessed for coupling or joining to other innerduct sections in order to increase the length of a conduit system. For example it is not necessary to dig or free an innerduct 16, 18, 20 from another innerduct or the wall of the outer conduit 12. Not only is this a time consuming task but the process could potentially damage the innerduct 16, 18, 20 or the outer conduit 12.

As should be further appreciated, a method is provided for allowing a contractor to complete an underground multichannel conduit installation in a single step. This method comprises furnishing a preassembled continuous multiduct assembly 10 on a receiver 22 such as the reel illustrated in FIGS. 1 and 2. As noted above the preassembled multiduct assembly 10 includes a continuous outer conduit 12 and multiple innerducts 16, 18, 20 held within a lumen 14 of the outer conduit. While three innerducts 16, 18, 20 are illustrated in the drawing figures it should be appreciated that substantially any number of innerducts may be provided including one, two, three, four or more.

The method may further include paying out the preassembled continuous multiduct assembly 10 from the receiver 22 and positioning the preassembled multiduct assembly in a trench that has been previously dug in the ground. The method may then further include running lines such as cable lines or electrical lines through the inner ducts 16, 18, 20 and then covering the preassembled multiduct assembly 10 in the trench. Significantly, since the multiduct assembly 10 includes the innerducts 16, 18, 20 in position in the lumen 14 when it is unwound from the reel 22 and positioned in the ground, the prior art step of pulling the loose innerducts through the outer conduit is eliminated. This allows the contractor to complete the installation in a single step and in a far more efficient and effective manner.

A method of manufacturing the multiduct assembly 10 will now be described in detail. That method may be broadly described as including the steps of extruding a continuous outer conduit 12 with a lumen 14, positioning multiple innerducts 16, 18, 20 within that lumen during extrusion of the continuous outer conduit and providing cooling to the innerducts during positioning in the lumen so as to prevent sticking of the innerducts to each other and to the continuous outer conduit during the production process.

In order to help illustrate the method, reference is now made to FIG. 3 showing a production line 30 for manufacturing the multiduct assembly 10. As illustrated, the line 30 includes a feed reel 32 for the first innerduct 16, a feed reel 34 for the second innerduct 18 and a feed reel 36 for the third innerduct 20. The innerducts 16, 18, 20 are fed from the feed reels 32, 34, 36 through the guide 38 and a lubricant shower 40. A lubricant is applied to the innerducts 16, 18, 20 as they are fed through the lubricant shower 40. That lubricant allows the innerducts 16, 18, 20 to be subsequently fed freely through the innerduct feed pipe 42. It also protects the innerducts 16, 18, 20 from sticking together and to the outer conduit 12 when exposed to heat resulting from the extrusion of the outer conduit 12 at the extruder. Lubricants useful for this purpose include cable lubricants such as SPY Spray Lubricant as sold by American Polywater Corporation of Stillwater, Minn.

As illustrated, the innerduct feed pipe 42 is fed into the head of the extruder 44 until it is about even with the die opening. Any necessary adjustments are made to be certain the feed pipe 42 is centered in the die opening and parallel with the walls inside the head. This is done to ensure that as the feed pipe 42 is subsequently pushed further into the hot outer conduit 12 during extrusion, it remains centered.

After setting the diameter and wall thickness for the outer conduit 12, the extruder 44 is started. Raw material for the extrusion of the outer conduit 12 is fed to the extruder 44 from the supply bin 46. As the extrusion of the outer conduit 12 begins, the feed pipe 42 is advanced into the hot, extruded outer conduit about 2.5 cm.

At this time the three innerducts 16, 18, 20 have been advanced through guide 38 and the ends thereof are connected together by heat resistant tape or other means. As can be seen in FIG. 3a, a pull line 39 is also attached to the ends of the innerducts 16, 18, 20 by that tape. The pull line 39 is then fed by a wire through the feed pipe 42 until it engages and sticks to the hot outer conduit 12 just beyond the end of the extruder 44. The outer conduit 12 is then marked where the pull line begins.

Next, the outer conduit 12 is cut on the winding end at the mark where the pull line 39 begins. The pull line slack is then pulled through as the taped ends of the innerducts 16, 18, 20 are fed into the feed pipe 42. When tight, the pull line 39 is taped or otherwise fastened to the end of the outer conduit 12.

During extrusion, the feed pipe 42 is adjusted in or out of the extruder 44 to prevent sticking between the innerducts 16, 18, 20 and the outer conduit 12. Cooling air is also supplied into the feed pipe 42 through the injector 48. That cooling air flows along the innerducts 16, 18, 20 to prevent their sticking together. It is typically best to use the minimum flow necessary for this purpose. The outer conduit 12 is marked again at the place where the innerducts 16, 18, 20 begin. The outer conduit 12 is then cut at that mark. The innerducts 16, 18, 20 are then pulled to confirm that there is no sticking.

The innerducts 16, 18, 20 are then temporarily fastened to the outer conduit 12 to ensure that the innerducts are pulled through the outer conduit 12 as it is formed by extrusion. This may be accomplished using heat resistant adhesive tape 52. After being formed at the extruder 44, the outer conduit 12 passes through the chilled water tank system 50. The chilled water tank system 50 may comprise a vacuum tank and multiple cooling showers or baths to quickly cool and harden the outer conduit 12 around the innerducts 16, 18, 20. The complete assembly 10 including the outer conduit 12 and innerducts 16, 18, 20 eventually reaches the receiver reel 22. The assembly 10 is attached to the reel 22 and winding begins.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of manufacturing a multiduct assembly comprising:

extruding a boreable, non-corrugated continuous outer conduit with a lumen;

positioning multiple inner ducts within said lumen during extrusion of said continuous outer conduit; and providing cooling to said inner ducts during positioning in said lumen so as to prevent sticking of said inner ducts to each other and to said continuous outer conduit during extrusion;

said method being characterized by:

temporarily securing free ends of said inner ducts to said outer conduit prior to completing extrusion of said outer conduit so that said inner ducts are pulled through said outer conduit as it is being extruded;

attaching said multiple inner ducts together adjacent free ends thereof prior to feeding through said lumen and connecting said free ends to said outer conduit; and attaching a pull line to said inner ducts, feeding an end of the pull line through an extruded outer conduit until it is attached to a soft portion of said extruded outer conduit, cutting said outer conduit past the pull line attachment point, pulling the pull line slack through said lumen of said outer conduit and taping the pull line to an end of outer conduit.

2. The method of claim 1, including providing said cooling by blowing cooling air along said inner ducts.

3. The method of claim 1 including cutting said outer conduit and inner ducts off at a position downstream from said pull line.

4. The method of claim 3 including winding said continuous multiduct assembly onto a reel.

5. The method of claim 1 including applying a high temperature lubricant to said inner ducts before said inner ducts enter said lumen to prevent said inner ducts from sticking to the outer conduit.

6. The method of claim 1, wherein the multiple inner ducts are hollow.

\* \* \* \* \*